(12) United States Patent
Kato et al.

(10) Patent No.: US 10,494,978 B2
(45) Date of Patent: Dec. 3, 2019

(54) SHIELD AND METHOD FOR PRODUCING SHIELD

(71) Applicant: NICHIAS CORPORATION, Tokyo (JP)

(72) Inventors: Tadakatsu Kato, Tokyo (JP); Sakae Mishina, Tokyo (JP)

(73) Assignee: NICHIAS CORPORATION, Tokyo (JP)

(*) Notice: Subject to any disclaimer, the term of this patent is extended or adjusted under 35 U.S.C. 154(b) by 342 days.

(21) Appl. No.: 14/781,669

(22) PCT Filed: Mar. 31, 2014

(86) PCT No.: PCT/JP2014/001880
§ 371 (c)(1),
(2) Date: Oct. 1, 2015

(87) PCT Pub. No.: WO2014/162724
PCT Pub. Date: Oct. 9, 2014

(65) Prior Publication Data
US 2016/0069244 A1    Mar. 10, 2016

(30) Foreign Application Priority Data
Apr. 3, 2013 (JP) ................................. 2013-077886

(51) Int. Cl.
*F01N 13/14* (2010.01)
*E04B 1/76* (2006.01)
(Continued)

(52) U.S. Cl.
CPC .............. *F01N 13/148* (2013.01); *B32B 3/28* (2013.01); *B32B 3/30* (2013.01); *B60R 13/0876* (2013.01);
(Continued)

(58) Field of Classification Search
CPC .. F01N 13/141; F01N 13/143; F01N 2260/20; F01N 2510/02; F01N 2510/04;
(Continued)

(56) References Cited

U.S. PATENT DOCUMENTS 4,378,046 A    3/1983   Klinger
5,633,067 A    5/1997   Illbruck et al.
(Continued)

FOREIGN PATENT DOCUMENTS

DE    91 10 552 U1    12/1992
DE    198 49 366 A1    4/2000
(Continued)

OTHER PUBLICATIONS

Extended European Search Report issued in corresponding application 14780235.9, completed Oct. 18, 2016 and dated Oct. 25, 2016.
(Continued)

*Primary Examiner* — Scott R. Walshon
*Assistant Examiner* — Jasper Saberi
(74) *Attorney, Agent, or Firm* — Oliff PLC

(57) ABSTRACT

Provided is a shield in which a flexible member is interposed between two metal plates; still unfilled spaces that are not filled with the flexible member are secured, so that the shielding properties are improved by air layers. The shield 1A includes two metal plates 2, 3 disposed to face each other, and a plate-shaped flexible member 4 interposed between the two metal plates. Each of the two metal plates 2, 3 has a plurality of protrusion-depression structures. Gap-forming means is provided to form gaps of a width greater than the thickness of the flexible member 4 between the two metal plates 2, 3 when the flexible member 4 is
(Continued)

interposed therebetween. Unfilled spaces (5) that are not filled with the flexible member 4 are provided between the two metal plates 2, 3.

10 Claims, 5 Drawing Sheets

(51) Int. Cl.
    *B32B 3/30*     (2006.01)
    *B32B 3/28*     (2006.01)
    *F02B 77/11*     (2006.01)
    *F02B 77/13*     (2006.01)
    *F01N 13/18*     (2010.01)
    *B60R 13/08*     (2006.01)
    *E04B 1/74*     (2006.01)
    *E04B 1/82*     (2006.01)

(52) U.S. Cl.
    CPC ............ *E04B 1/7612* (2013.01); *F01N 13/14* (2013.01); *F01N 13/141* (2013.01); *F01N 13/143* (2013.01); *F01N 13/1866* (2013.01); *F02B 77/11* (2013.01); *F02B 77/13* (2013.01); *B32B 2307/102* (2013.01); *B32B 2307/304* (2013.01); *E04B 2001/742* (2013.01); *E04B 2001/747* (2013.01); *E04B 2001/8281* (2013.01); *F01N 2260/20* (2013.01); *F01N 2510/02* (2013.01); *F01N 2510/04* (2013.01)

(58) Field of Classification Search
    CPC ... F01N 13/14; F01N 13/148; B60R 13/0876; F02B 77/11; F02B 77/13; B32B 3/28; B32B 3/30; B32B 2250/40; B32B 2307/102; B32B 2307/304; B32B 7/045; B32B 2250/03; B32B 2605/08; B32B 2307/546; E04B 2001/742; E04B 2001/747; E04B 1/7612; E04B 2001/8281
    See application file for complete search history.

(56) References Cited

U.S. PATENT DOCUMENTS

| | | | |
|---|---|---|---|
| 5,981,082 A * | 11/1999 | Pirchl | ................. F16L 59/07 228/59 |
| 2006/0124387 A1 | 6/2006 | Berbner et al. | |
| 2006/0194025 A1 | 8/2006 | Oxenknect | |
| 2015/0068835 A1* | 3/2015 | Dedene | ................. F01N 13/008 181/256 |
| 2015/0184572 A1* | 7/2015 | Sim | ................. B32B 3/28 603/323 |
| 2015/0184573 A1* | 7/2015 | Sim | ................. B32B 15/01 428/593 |

FOREIGN PATENT DOCUMENTS

| | | |
|---|---|---|
| JP | 5-39652 A | 2/1993 |
| JP | 7-42423 U | 8/1995 |
| JP | 3326273 B2 | 7/2002 |
| JP | 2003-293765 A | 10/2003 |
| JP | 2006-519710 A | 8/2006 |
| JP | 2008-531919 A | 8/2008 |
| WO | 2008/128789 A1 | 10/2008 |

OTHER PUBLICATIONS

International Search Report issued in corresponding application PCT/JP2014/001880, completed Apr. 14, 2014 and dated Apr. 28, 2014.

International Preliminary Report on Patentabiliity issued in corresponding application PCT/JP2014/001880, dated Oct. 6, 2015.

* cited by examiner (a)

(b)

(a)

(b)

SHIELD AND METHOD FOR PRODUCING SHIELD

This is a National Phase Application in the United States of International Patent Application No. PCT/JP2014/001880 filed Mar. 31, 2014, which claims priority on Japanese Patent Application No. 2013-077886, filed Apr. 3, 2013. The entire disclosures of the above patent applications are hereby incorporated by reference.

TECHNICAL FIELD

The present invention relates to a shield which covers a predetermined device. More particularly, the present invention relates to a shield which covers a heat or noise generator such as an exhaust manifold or a turbocharger attached to an engine, and a method for producing the shield.

BACKGROUND ART

There is known a shield which covers a heat or noise generator such as an exhaust manifold or a turbocharger attached to an engine.

Such a shield is called an exhaust manifold cover or a heat insulator, and is configured to block the transmission of heat or sound to other components around the engine and to the outside of a vehicle.

The shield generally comprises two metal plates disposed to face each other, and a plate-shaped flexible member including a heat insulating material or a sound absorbing material interposed between the two metal plates (e.g. Patent Literatures 1 and 2).

The shield has a protrusion-depression structure on the surface, and thereby improves the rigidity of this shield, and the vibration-damping properties to inhibit the vibration of this shield.

Such a shield is normally molded into a desired shape by being pressed in a predetermined die with the flexible member interposed between the two metal plates.

CITATION LIST

Patent Literature

Patent Literature 1: Japanese Patent Publication Laid-open No. 2008-531919
Patent Literature 2: Japanese Patent No. 3326273

SUMMARY OF INVENTION

Technical Problem

Such a conventional shield has the following problems.

The shield described in Patent Literature 1 has a structure in which the flexible member fills the space between the two metal plates without any gaps, so that the heat insulating properties and vibration-damping properties depend exclusively on the properties of the flexible member.

Increasing the thickness of the flexible member is most effective in enhancing shielding properties of the shield such as heat insulating properties and sound insulating properties. However, this improves the shielding properties but prevents the compaction of the shield, and leads to the problem of reduced receiving capacity in an engine room.

In the manifold cover described in Patent Literature 2, one metal plate alone has the protrusion-depression structure, and the other metal plate is plate-shaped, so that a space which is not filled with the flexible member is provided between the two metal plates. However, there is fear that the shielding properties deteriorate because the other metal plate has no protrusion-depression structure.

The present invention has been made to solve the above problems, and is intended to provide a shield in which shielding properties such as heat insulating properties and sound insulating properties are improved by interposing a flexible member between two metal plates each having a plurality of protrusion-depression structures and by securing a space which is not filled with the flexible member between the two metal plates.

Solution to Problem

To achieve the above object, there is provided a shield according to the present invention including two metal plates disposed to face each other, and a plate-shaped flexible member interposed between the two metal plates. Each of the two metal plates has a plurality of protrusion-depression structures. Gap-forming means is provided to form gaps of a width greater than the thickness of the flexible member between the two metal plates when the flexible member is interposed therebetween. Unfilled spaces that are not filled with the flexible member are provided between the two metal plates.

There is also provided a method for producing a shield according to the present invention. The shield includes two metal plates disposed to face each other, and a plate-shaped flexible member interposed between the two metal plates. The method includes a corrugating step of molding a plurality of protrusion-depression structures in the two metal plates, and an interposing step of interposing the flexible member between the two metal plates so that the flexible member is fixed at a predetermined position between the two metal plates in which the protrusion-depression structures have been molded.

Advantageous Effects of Invention

According to the shield and the method for producing the shield of the present invention, a flexible member is interposed between two metal plates; still unfilled spaces that are not filled with the flexible member are secured, so that shielding properties can be improved by air layers.

DESCRIPTION OF EMBODIMENTS

Hereinafter, preferred embodiments of a shield and a method for producing the shield according to the present invention will be described with reference to FIG. 1 to FIG. 5.

Shields 1 (1A to 1C) according to the present embodiment are configured as covers which cover a heat or noise generator such as an exhaust manifold or a turbocharger attached to an engine.

Each of the shields 1 (1A to 1C) has two metal plates 2 and 3 disposed to face each other, and a plate-shaped flexible member 4 interposed between the two metal plates 2 and 3. Gaps of a width greater than the thickness of the flexible member 4 are formed between the two metal plates 2 and 3 so that each of the shields 1 (1A to 1C) has the characteristic of having unfilled spaces 5 that are not filled with the flexible member 4 between the two metal plates.

To have such a characteristic, the metal plates 2 and 3 and the flexible member 4 are configured as follows:

The two metal plates 2 and 3 include, for example, metallic plate-shaped members which have a thickness of 0.05 to 1.50 mm and which are made of stainless steel, aluminum, magnesium, iron, an alloy of the above substances, and the above substances that are plated. Each of the two metal plates 2 and 3 has a plurality of protrusion-depression structures.

Figure 1:
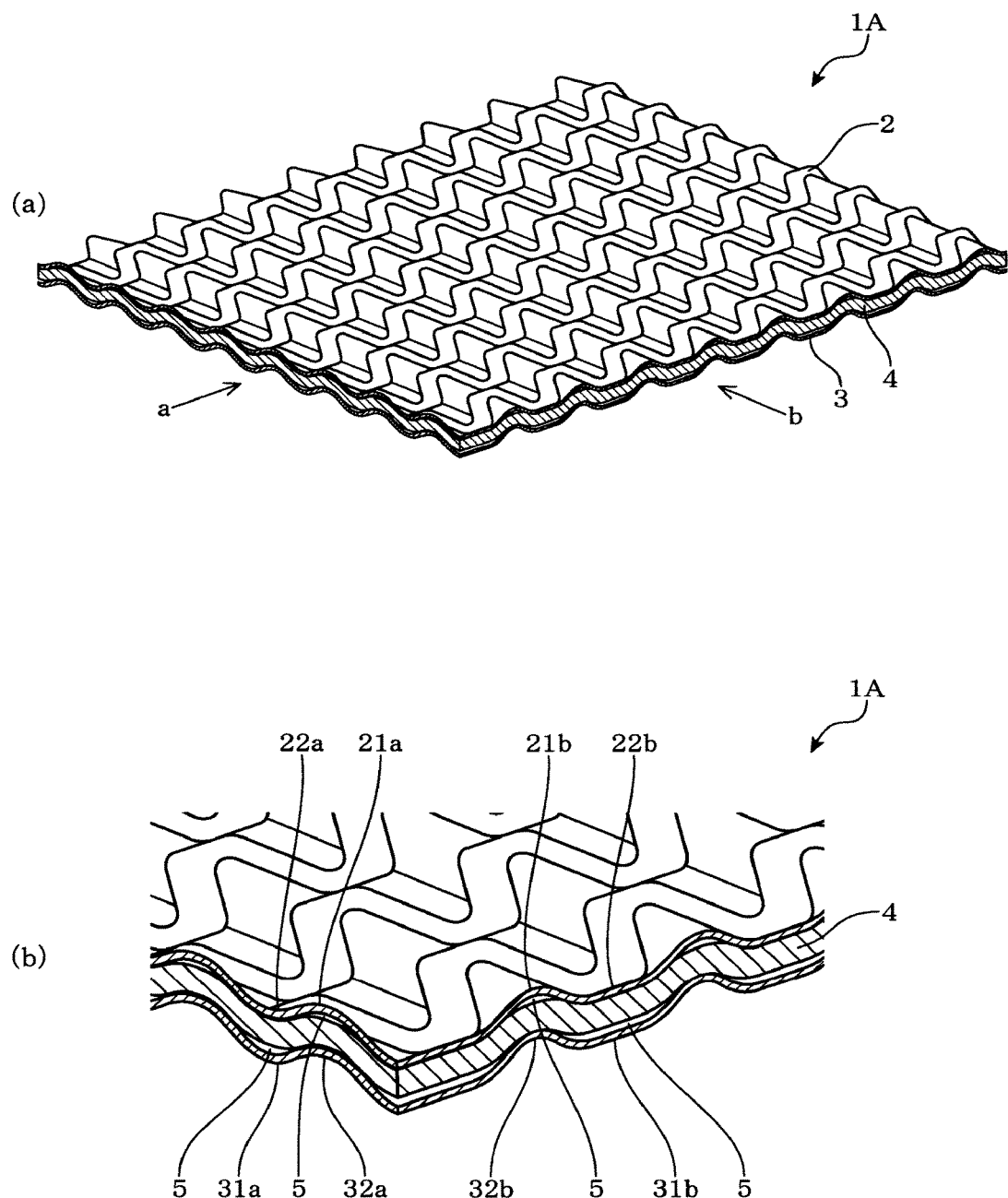
FIG. 1 is a perspective view of a shield according to one embodiment of the present invention, in which (a) is a perspective view of the entirety, and (b) is a perspective view of essential parts.

Specifically, as shown in FIG. 1, the metal plate 2 has a protrusion-depression structure in which protrusions 21a and depressions 22a alternate when seen from an a-direction and in which protrusions 21b and depressions 22b alternate when seen from a b-direction that intersects substantially at right angles with the a-direction.

Similarly, the metal plate 3 has a protrusion-depression structure in which protrusions 31a and depressions 32a alternate when seen from the a-direction and in which protrusions 31b and depressions 32b alternate when seen from the b-direction.

The protrusion-depression structures of the two metal plates 2 and 3 are formed to be able to fit into each other so that the protrusions of one metal plate fit into the depressions of the other metal plate when the two metal plates 2 and 3 are laid on each other without the flexible member 4 interposed therebetween.

In order to obtain such a configuration, it is necessary that at least the distance between the respective protrusion-depression structures of the two metal plates 2 and 3, that is, the distance (pitch) between the adjacent protrusion and depression should be the same. Thus, the respective protrusion-depression structures of the metal plates 2 and 3 are configured, for example, so that the distance between the adjacent protrusions 21a is the same as the distance between the adjacent depressions 32a when seen from the a-direction and so that the distance between the adjacent protrusions 21b is the same as the distance between the adjacent depressions 32b when seen from the b-direction.

In the shield 1A shown in FIG. 1, the protrusion-depression structure seen from the a-direction and the protrusion-depression structure seen from the b-direction have the same shape in both of the two metal plates 2 and 3. When the two metal plates 2 and 3 are laid on each other without the flexible member 4 interposed therebetween, the protrusions of one metal plate fit in close contact into the depressions of the other metal plate without any gaps.

As long as the distance between the protrusion-depression structures is the same, the shape of the protrusion-depression structure, for example, the height difference (amplitude) between the protrusion and the depression or the shapes (corrugated shapes) of the protrusion and the depression may vary. In this case, when the two metal plates 2 and 3 are laid on each other without the flexible member 4 interposed therebetween so that the protrusions of one metal plate fit into the depressions of the other metal plate, gaps are formed between the two metal plates. However, even if such gaps are formed, the two metal plates have a relation that allows these plates to fit into each other.

The two metal plates 2 and 3 are disposed to face each other with the plate-shaped flexible member 4 interposed therebetween so as to have a positional relation that allows the protrusion-depression structures of the metal plates 2 and 3 to fit into each other.

Having the positional relation that allows the protrusion-depression structures of the metal plates 2 and 3 to fit into each other means that a pair of the depression and the protrusion of the two metal plates 2 and 3 face each other and that, as shown in FIG. 2(a), for example, the protrusions 21a and the depressions 32a face each other and the depressions 22a and the protrusions 31a face each other.

When the two metal plates 2 and 3 are disposed to face each other in such a state, the thickness of the whole shield 1 can be smaller and the shield 1 can be compacter than when the two metal plates 2 and 3 are disposed to face each other so as to have a positional relation that allows the protrusions (e.g. the protrusions 21a and the protrusions 31a) to face each other.

The flexible member 4 is made of a flexible plate-shaped member, and can be made of a heat insulating material in which a mineral such as vermiculite is used as a raw material.

The flexible member 4 of the shield 1A shown in FIG. 1 has flexibility but maintains elasticity that resists the protrusion-depression structures when interposed between the two metal plates 2 and 3, so that the flexible member 4 does not adapt (fit) to and come into close contact with the shapes of the protrusion-depression structures.

The degree at which this flexible member 4 adapts to the shapes of the protrusion-depression structures varies with the combination of the shapes of the protrusion-depression structures, the distance between the adjacent protrusion-depression structures, and the properties of the flexible member.

The properties of the flexible member 4 are, for example, morphological properties and physical properties.

Regarding the morphological properties, for example, the flexible member 4 is more adaptable to the shapes of the protrusion-depression structures when the thickness is smaller, whereas the flexible member 4 is less adaptable to the shapes of the protrusion-depression structures when the thickness is larger.

Regarding the physical properties, for example, the flexible member 4 is more adaptable to the shapes of the protrusion-depression structures when the flexible member 4 is softer, whereas the flexible member 4 is less adaptable to the shapes of the protrusion-depression structures when the flexible member 4 is harder.

The degree at which this flexible member 4 adapts to the protrusion-depression structures varies not only with the properties of the flexible member 4 but also with the shapes of the protrusion-depression structures and the distance (pitch) between the adjacent protrusion and depression.

For example, the flexible member 4 is more adaptable to the shapes of the protrusion-depression structures when the curvature of each of the depressions and the protrusions of the protrusion-depression structures is smaller, whereas the flexible member 4 is less adaptable to the shapes of the protrusion-depression structures when the curvature of each of the depressions and the protrusions of the protrusion-depression structures is greater and the shapes thereof are more V-shaped.

The flexible member 4 is more adaptable to the shapes of the protrusion-depression structures when the distance (pitch) between the adjacent protrusion-depression structures is greater, whereas the flexible member 4 is less adaptable to the shapes of the protrusion-depression structures when the distance (pitch) is smaller.

Thus, the degree at which this flexible member 4 adapts to the protrusion-depression structures becomes higher or lower depending on the combination of the shapes of the protrusion-depression structures, the distance between the adjacent protrusion-depression structures, and the properties of the flexible member.

If the flexible member 4 is more adaptable to the shapes of the protrusion-depression structures, the flexible member 4, when interposed between the two metal plates 2 and 3, adapts to and comes into close contact with the protrusion-depression structures without resisting the protrusion-depression structures, so that the flexible member 4 fills the space between the two metal plates 2 and 3 with the flexible member 4 interposed therebetween without any gaps.

In contrast, if the flexible member 4 is less adaptable to the protrusion-depression structures, the flexible member 4, when interposed between the two metal plates 2 and 3, can maintain elasticity that resists the protrusion-depression structures, and a space which is not filled with the flexible member 4 is more easily formed between the two metal plates 2 and 3 with the flexible member 4 interposed therebetween. That is, if the flexible member 4 is less adaptable to the protrusion-depression structures, a gap of a width greater than the thickness of the flexible member 4 is formed between a pair of the depression and the protrusion of the two metal plates 2 and 3.

Accordingly, in the shield 1A shown in FIG. 1, the flexible member 4, when interposed between the two metal plates 2 and 3, can maintain elasticity that resists the protrusion-depression structures, and the combination of the shapes of the protrusion-depression structures, the distance between the adjacent protrusion-depression structures, and the properties of the flexible member is selected such that the flexible member 4 does not adapt in close contact to the protrusion-depression structures (gap-forming means).

For example, regarding the shapes of the protrusion-depression structures, the curvature of the protrusions 21a (the protrusions 31a) or the depressions 22a (the depressions 32a) is 0.33 to 5.00, and the distance between the protrusion-depression structures (the distance between the protrusions 21a and between the protrusions 21b) is 1.0 to 13.0 (mm).

Regarding the properties of the flexible member 4, the thickness is 0.5 to 12.0 (mm), the surface density is 300 to 3000 (g/m$^2$), and the Young's modulus is 1 to 10000 (N/mm$^2$).

Figure 2:
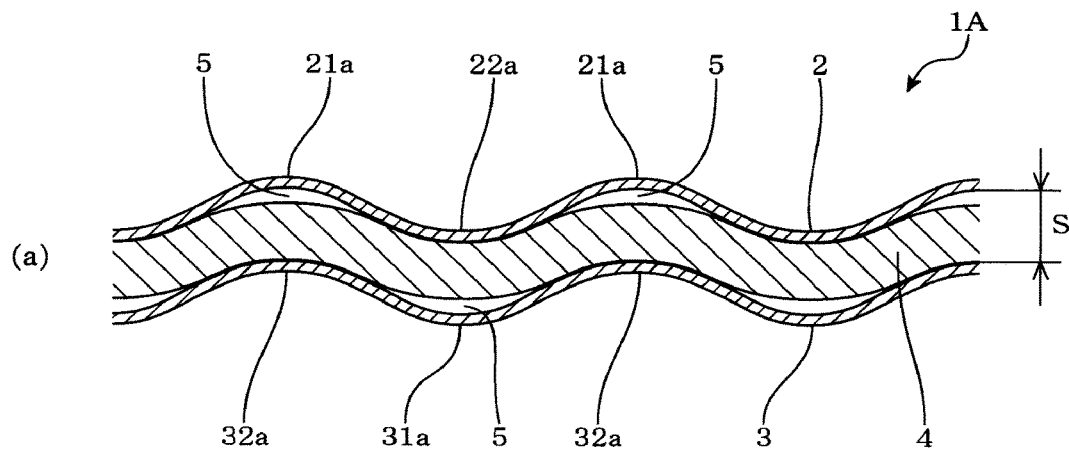
FIG. 2 is a sectional view of the shield according to one embodiment of the present invention, in which (a) is a sectional view seen from an a-direction, and (b) is a sectional view seen from a b-direction.
Figure 2:
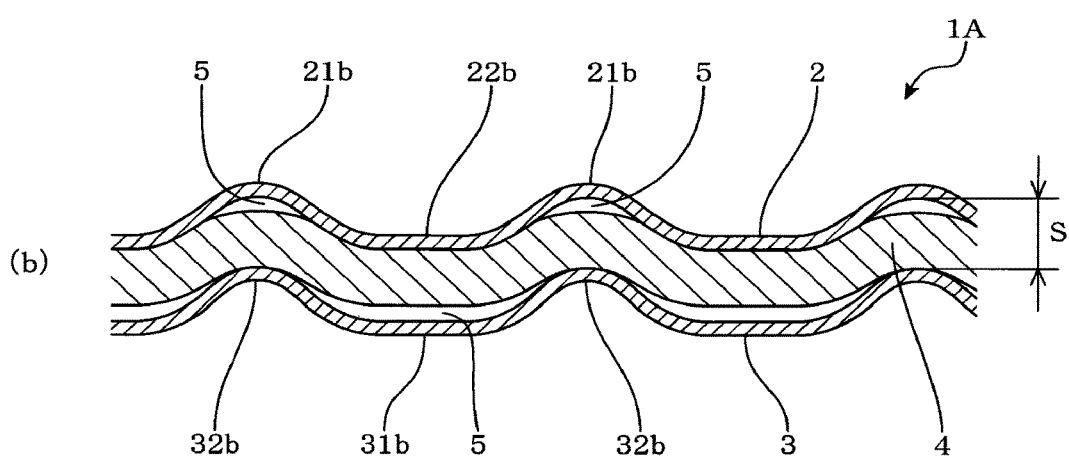

Owing to this combination, the flexible member 4, when interposed between the two metal plates 2 and 3, can maintain elasticity that resists the protrusion-depression structures without adapting in close contact to the protrusion-depression structures, and a gap S (0.6 to 17.0 mm) having the width of the flexible member 4×101 to 1100% is formed between the two metal plates 2 and 3 and between a pair of the depression and the protrusion facing each other, as shown in FIG. 2.

As a result, the unfilled spaces 5 that are not filled with the flexible member 4 are formed between the two metal plates 2 and 3 with the flexible member 4 interposed therebetween (see FIGS. 1 and 2).

In the present embodiment, the unfilled spaces 5 are formed to correspond to the parts of the surface of the shield 1 which protrude.

For example, as shown in FIG. 2(a), the unfilled spaces 5 are formed to correspond to the parts of the surface of the shield 1A which are the protrusions 21a and the protrusions 31a.

Similarly, as shown in FIG. 2(b), the unfilled spaces 5 are formed to correspond to the parts of the surface of the shield 1A which are the protrusions 21b and the protrusions 31b.

Thus, the unfilled spaces 5 are formed between the two metal plates 2 and 3 with the flexible member 4 interposed therebetween, so that air layers filling these unfilled spaces 5 become thermal resistance and prevent the transmission of heat, and the heat insulating properties of the shield 1A therefore improve.

In contrast, the flexible member 4 is in contact with the depressions in the parts of the surface of the shield 1A which are depressed.

For example, in FIG. 2(a), the flexible member 4 is in contact with the parts of the surface of the shield 1A which are the depressions 22a and the depressions 32a, and in FIG. 2(b), the flexible member 4 is in contact with the parts of the surface of the shield 1A which are the depressions 22b and the depressions 32b.

Owing to such contact, vibration that is transmitted to the metal plates 2 and 3 from a noise generator such as an exhaust manifold or a turbocharger is absorbed by the flexible member 4, and sound insulating properties can be secured.

In order for the flexible member 4 to maintain the elasticity that resists the protrusion-depression structures when interposed between the two metal plates 2 and 3, it is preferable to bring the two metal plates 2 and 3 closer to each other in this state and apply no external force that plastically deforms the flexible member 4.

Figure 3:
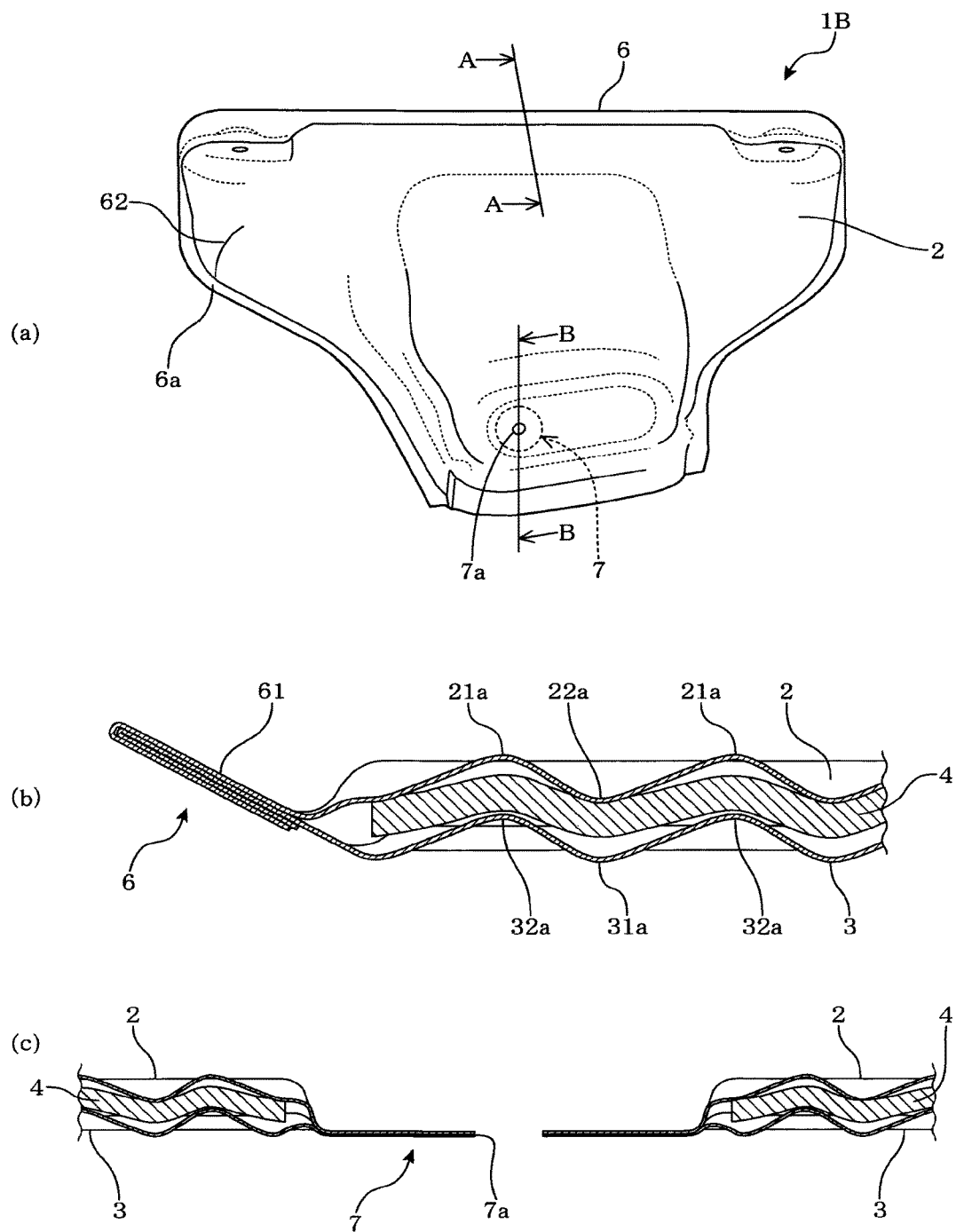
FIG. 3 is a perspective view of the shield according to one embodiment of the present invention, in which (a) is a perspective view of the entirety, (b) is an A-A sectional view, and (c) is a B-B sectional view.
Figure 4:
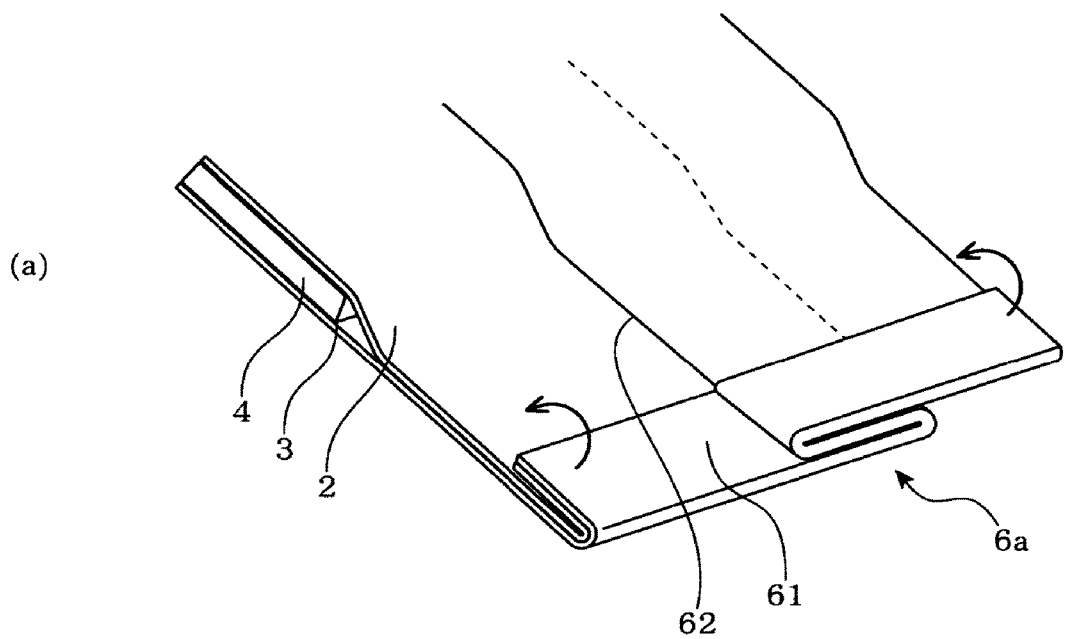
FIG. 4 is a perspective view of a bent portion of the shield according to one embodiment of the present invention, in which (a) is a view before bending, and (b) is a view after bending.
Figure 4:
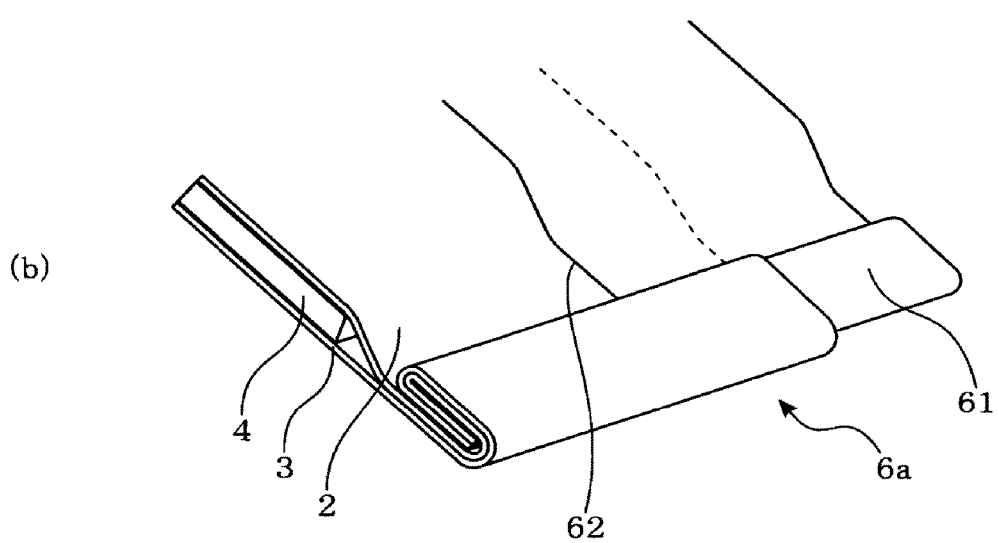

The shield 1B according to another embodiment has a configuration similar to that of the shield 1A as shown in each drawing of FIG. 3 (the protrusion-depression structures are not shown in FIG. 3(a)), and is molded by press work and thus has a shape that can cover a heat or noise generator such as an exhaust manifold or a turbocharger.

The shield 1B having such a shape is produced via the following processes.

Specifically, the shield 1B is produced via a production process including at least a corrugating step of molding a plurality of protrusion-depression structures in the two metal plates 2 and 3, and an interposing step of interposing the flexible member 4 between the two metal plates 2 and 3 so that the flexible member 4 is fixed at a predetermined position between the two metal plates 2 and 3 in which the protrusion-depression structures have been molded.

In the corrugating step, a plurality of protrusion-depression structures are molded in the two metal plates 2 and 3.

Specifically, for example, the plate-shaped metal plates 2 and 3 are put one by one between a pair of corrugated rolls which have protrusion-depression surface in the circumferential surface and which are disposed to face each other and are then respectively corrugated, so that a plurality of protrusion-depression structures can be molded in the two metal plates 2 and 3.

According to the metal plates 2 and 3 in the present embodiment, the plate-shaped metal plates 2 and 3 are put one by one between a pair of corrugated rolls from one direction to mold a protrusion-depression structure in which the protrusions 31a and the depressions 32a alternate when seen from the a-direction. The metal plates 2 and 3 after the molding are rotated 90 degrees from the one direction, and the metal plates 2 and 3 are put one by one between other corrugated rolls or the same corrugated rolls to mold a protrusion-depression structure in which the protrusions 31b and the depressions 32b alternate when seen from the b-direction.

It is also possible to mold a plurality of protrusion-depression structures in the two metal plates 2 and 3 by putting the plate-shaped metal plates 2 and 3 one by one between a pair of male and female dies having protrusion-depression surfaces in the surfaces facing each other, and bringing the dies closer to press the metal plates 2 and 3.

In such a corrugating step, the protrusion-depression structure can be molded in the two metal plates 2 and 3 one by one. However, it is also possible to simultaneously mold the same protrusion-depression structure in the two metal plates 2 and 3 by putting the two metal plates 2 and 3 that are laid on each other between the corrugated rolls or by pressing the two metal plates 2 and 3.

By such a simultaneous corrugating step, the protrusion-depression structures of the two metal plates 2 and 3 are formed to be able to fit into each other, and when the two metal plates 2 and 3 are laid on each other without the flexible member 4 interposed therebetween, the protrusions of one metal plate fit in close contact into the depressions of the other metal plate without any gaps.

In the interposing step, the flexible member 4 is interposed between the two metal plates 2 and 3 in which the protrusion-depression structures have already been molded.

During the interposition, it is preferable to fix the flexible member 4 at a predetermined position while aligning the flexible member 4 so that the flexible member 4 may not be displaced between the two metal plates 2 and 3, and the flexible member 4 is fixed so that at least the flexible member 4 may be within the outer shapes of the two metal plates 2 and 3.

When the flexible member 4 is put between the two metal plates 2 and 3, the relation in which the two metal plates 2 and 3 are disposed to face each other is adjusted.

For example, while the side surfaces of the two metal plates 2 and 3 are visually observed, the two metal plates 2 and 3 are displaced parallel to adjust the relation in which the two metal plates 2 and 3 are disposed to face each other.

In this instance, the two metal plates 2 and 3 are disposed to face each other so that the unfilled spaces 5 that are not filled with the flexible member 4 are formed between the two metal plates 2 and 3 with the flexible member 4 interposed therebetween.

In the present embodiment, the combination of the shapes of the protrusion-depression structures, the distance between the adjacent protrusion-depression structures, and the properties of the flexible member is selected such that the unfilled spaces 5 are formed even if the two metal plates 2 and 3 are disposed to face each other so as to have a positional relation that allows the respective protrusion-depression structures to fit into each other. Thus, the interposing step is conducted while the two metal plates 2 and 3 are disposed to face each other so as to have a positional relation that allows the above fitting.

If the flexible member 4 is interposed between the two metal plates 2 and 3 after the corrugating step, the following advantageous effects are provided.

If the two metal plates 2 and 3 are, for example, pressed for corrugation with the flexible member 4 interposed therebetween in the corrugating step, the flexible member 4 is plastically deformed and adapts in close contact to the shapes of the protrusion-depression structures, and the flexible member 4 fills the space between the two metal plates 2 and 3 without any gaps, so that the unfilled spaces 5 are not formed. Thus, for such a reason, the flexible member 4 is interposed between the two metal plates 2 and 3 after the protrusion-depression structures are molded. Consequently, it is possible to maintain the elasticity that resists the protrusion-depression structures when the flexible member 4 is interposed between the two metal plates 2 and 3 owing to the shapes of the protrusion-depression structures, the distance between the adjacent protrusion-depression structures, and the properties of the flexible member 4 that have been selected as a combination such that the flexible member 4 does not adapt in close contact to the protrusion-depression structures. Accordingly, the unfilled spaces 5 are formed between the two metal plates 2 and 3.

The shield 1B is formed into a product through the following steps in addition to the above steps: a shearing step of shearing the two metal plates 2 and 3 into predetermined outer shapes, a bending step of bending peripheral edges 6 of the two metal plates 2 and 3 substantially toward the center after the interposing step, a molding step of molding into a shape that can cover a heat or noise generator, and a boring step of forming an attachment bore 7a for attachment to the heat or noise generator.

In the shearing step, punching is performed by a press working machine to punch the two metal plates 2 and 3 into the predetermined outer shapes one by one or in an overlap state.

In the shearing step, it is also possible to shear (or punch) the flexible member 4 into a predetermined outer shape.

This shearing step can also be conducted after the corrugating step and before the interposing step. The shearing step can also be conducted before the corrugating step.

The bending step is conducted after the interposing step. The peripheral edges 6 of the two metal plates 2 and 3 with the flexible member 4 interposed therebetween are bent substantially toward the center.

In this bending step, for example, the peripheral edges 6 are bent more than once by the press working machine to form bent portions 61. In this bending step, it is preferable that the flexible member 4 is not interposed between the peripheral edges 6 as shown in FIG. 3(b). This is because the size of the flexible member 4 is reduced and the product cost can be suppressed accordingly and because bending accuracy can be enhanced and outer shape dimensional accuracy is improved.

The bending step can also be conducted after the following molding step.

The molding (forming) step is conducted after the bending step. In this step, the two metal plates 2 and 3 between which the flexible member 4 is interposed and in which the bent portions 61 are formed in the peripheral edges 6 are set in a pressing machine in which a pair of male and female dies are disposed. The two metal plates 2 and 3 are pressed in the dies, so that the shield 1B having a three-dimensional shape shown in FIG. 3(a) is three-dimensionally molded.

Figure 5:
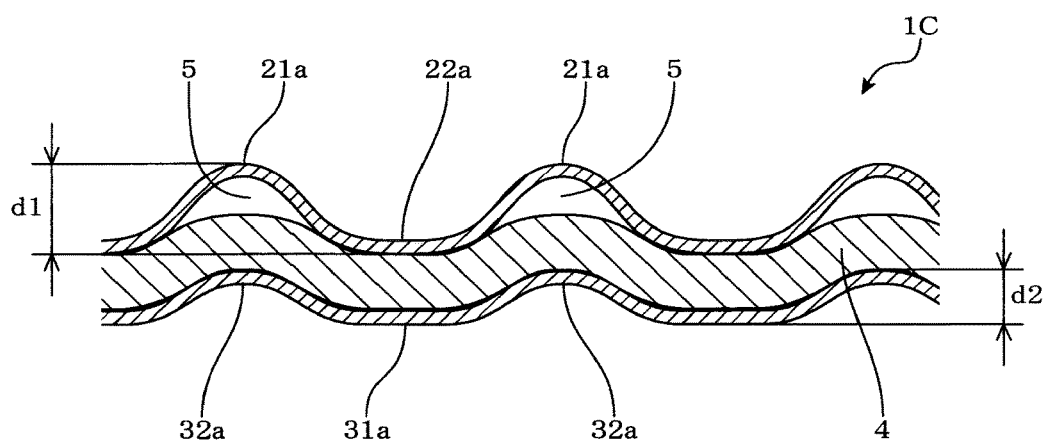
FIG. 5 is a sectional view of a shield according to another embodiment of the present invention.

In this pressing, it is preferable to secure gaps of a width W shown in Expression 1 between the male and female dies when the dies are closest to each other so that the unfilled spaces 5 may not disappear.

$$W \leq t + d1 + d2 \qquad \text{(Expression 1)}$$

wherein t is the thickness of the flexible member 4, d1 is the height difference between the protrusion-depression structures of the metal plate 2, and d2 is the height difference between the protrusion-depression structures of the metal plate 3 (for d1 and d2, see FIG. 5).

The optimum width W can be determined by reducing the maximum width (=t+d1+d2) little by little. For example, it is possible to determine, as the optimum width W, a value at which the respective protrusion-depression structures of the two metal plates 2 and 3 are not crushed and deformed and at which the thickness of the whole shield 1B is minimized while the unfilled spaces 5 are secured.

This molding step can also be conducted before the interposing step.

The boring step is conducted after the molding step. In this step, the attachment bore 7a is press-cut and drilled by, for example, the press working machine.

It is preferable that the flexible member 4 is not interposed in a peripheral region 7 of the attachment bore 7a either as shown in FIG. 3(c). This is because if the flexible member 4 is interposed in the peripheral region 7, the stability during device attachment deteriorates due to the flexibility of the flexible member 4, but if the flexible member 4 is not interposed in the peripheral region 7, attachment accuracy is enhanced, and the stability during attachment is improved.

The boring step is not exclusively conducted after the molding step, and can also be conducted simultaneously with, for example, the shearing step or the bending step.

To eliminate molding wrinkles having no directionality that are formed in a corner portion 6a in, for example, the molding step, a folded portion 62 in which the metal plates 2 and 3 are folded along the outer circumferential direction is formed as shown in FIG. 3(a) and FIG. 4(a). However, it is preferable to further conduct the bending step after the folded portion 62 is formed.

Thus, as shown in FIG. 4(b), the bent portion 61 holds down the folded portion 62, and chatter vibration caused by the contact of the metal plates in the folded portion 62 is suppressed as compared to the case shown in FIG. 4(a).

The corner portion 6a is bent twice in the bent portion 61 in the example shown in FIG. 4(b). However, if the bending step is conducted after the molding step in which the folded portion 62 is formed, the bent portion 61 holds down the folded portion 62 even when the corner portion 6a is bent once.

Next, the results of a test of shielding properties conducted for the shield 1A are shown below.

Prepared test targets were the shield 1A, and as comparative examples, a shield X in which the flexible member 4 filled the space between the two metal plates 2 and 3 without any gaps and which did not have the unfilled spaces 5, and a shield Y in which the protrusion-depression structures were formed in only one of the two metal plates 2 and 3 and which did not have the unfilled spaces 5.

Regarding a test method, each of the shields was disposed to a cover stainless steel plate heated by a heater, and the surface temperature of a measurement target (e.g. a resin member) disposed on the surface of each of the shields opposite to the surface facing the stainless steel plate was measured.

In this instance, the distance between the stainless steel plate and each of the shields was set to a constant value (e.g. 10 mm), and the distance between the stainless steel plate and the measurement target was set to a constant value (e.g. 25 mm). The electric energy of the heater was set to constant energy (e.g. 462 Wh) so that the surface temperature of the stainless steel plate was at a constant temperature (e.g. 550° C.).

Regarding the test results, the surface temperature of the measurement target was 10° C. lower in the shield 1A than in the shield X, and was lower 5° C. lower in the shield 1A than in the shield Y.

That is, it can be said that shielding properties associated with the heat insulating properties are higher in the shield having the unfilled spaces 5 than in the shield having no unfilled spaces 5 and that when the shield has the unfilled spaces 5, the heat insulating properties are higher in the shield which has the protrusion-depression structures in each of the two metal plates 2 and 3 and in which the unfilled spaces 5 are equally disposed between the two metal plates 2 and 3 than in the shield which has the protrusion-depression structures in only one of the metal plates.

As described above, according to the shield and the method for producing the shield in the present embodiment, the flexible member is interposed between the two metal plates; still the unfilled spaces that are not filled with the flexible member are secured, so that the shielding properties can be improved.

While the preferred embodiments of the shield and the method for producing the shield according to the present invention have been described above, it should be understood that the shield and the method for producing the shield according to the present invention are not limited to the embodiments described above and various modifications can be made within the scope of the present invention.

For example, although the height difference between the depressions and the protrusions in the protrusion-depression structures of each of the metal plates 2 and 3 is the same in the present embodiment, the height difference in each of the protrusion-depression structures can be varied as in the shield 1C shown in FIG. 5 (gap-forming means).

In the shield 1C according to this embodiment, the distance (pitch) between the adjacent protrusion-depression structures of each of the metal plates 2 and 3 is the same, but a height difference d1 in the protrusion-depression structures of the metal plate 2 is greater than a height difference d2 in the protrusion-depression structures of the metal plate 3.

Thus, gaps of a width greater than the thickness of the flexible member 4 are certainly formed between a pair of the depression and the protrusion facing each other between the two metal plates 2 and 3, and the unfilled spaces 5 can be secured between the two metal plates 2 and 3.

As the method for certainly forming the gaps of the width greater than the thickness of the flexible member 4 between a pair of the depression and the protrusion facing each other, it is possible to use not only a method whereby the height difference in the protrusion-depression structures of each of the metal plates 2 and 3 is varied but also a method whereby each of the curvatures that determine the shapes of the protrusion-depression structures is varied (gap-forming means).

Specifically, in FIG. 2(a), the curvature of the protrusions 21a is greater than the curvature of the depressions 32a, or in an extreme example, the depressions 32a are arc-shaped, whereas the protrusions 21a are V-shaped, so that a gap of a width greater than the thickness of the flexible member 4 is formed between a pair of the depression and the protrusion, and the unfilled spaces 5 can be secured between the two metal plates 2 and 3.

The following method can be used as the optimum example of such an embedment in which the curvature is varied.

For example, as shown in FIGS. 2(a) and 2(b), in the protrusion-depression structures of each of the two metal plates 2 and 3, the distance (pitch) between the adjacent protrusion-depression structures is the same but the curvature of the protrusions 21b is greater than the curvature of the depressions 32a in the protrusion-depression structures seen from the a-direction and the protrusion-depression structures seen from the b-direction.

Thus, the metal plate 2 and the metal plate 3 are rotated 90 degrees parallel to each other in FIG. 1(a) so that the protrusions 21b and the depressions 32a face each other, and the two metal plates 2 and 3 are disposed to face each other so as to have a positional relation that allows the respective protrusion-depression structures to fit into each other, whereby the protrusions and the depressions having different curvatures can face each other. Consequently, a gap of a width greater than the thickness of the flexible member 4 can be formed between a pair of the depression and the protrusion, and the unfilled spaces 5 can be secured between the two metal plates 2 and 3.

Since there is a difference of flexural strength between the a-direction and the b-direction, the strength difference is complemented if one of the two metal plates 2 and 3 is thus rotated 90 degrees so that the two metal plates 2 and 3 are disposed to face each other. As a result, the rigidity of the whole shield 1A can be enhanced.

It is also possible to form a gap of a width greater than the thickness of the flexible member 4 between a pair of the depression and the protrusion by combining the height difference and the curvature of the protrusion-depression structures.

In the shield 1 (1A to 1C) according to the respective embodiments, the two metal plates 2 and 3 are disposed to face each other so as to have a positional relation that allows the protrusion-depression structures to fit into each other. However, it is also possible that the two metal plates 2 and 3 are disposed to face each other so as not to have the above relation, that is, so that the two metal plates 2 and 3 are displaced (shifted) a distance less than the distance between the protrusion-depression structures (e.g. between the protrusions) (gap-forming means).

For example, it is also possible that the two metal plates 2 and 3 are disposed to face each other so as to have a positional relation that allows the protrusions of the two metal plates 2 and 3 to face each other. Specifically, in FIG. 2(a), it is also possible that the two metal plates 2 and 3 are disposed to face each other so as to have a positional relation that allows the protrusions 21a and the protrusions 31a to face each other. As a result of such a positional relation that allows the protrusions to face each other, gaps of a width greater than the thickness of the flexible member 4 are naturally formed between the two metal plates 2 and 3 (e.g. between the protrusions 21a and the protrusions 31a) when the flexible member 4 is interposed therebetween.

INDUSTRIAL APPLICABILITY

The present invention can be widely used in a shield which covers a heat or noise generator such as an exhaust manifold or a turbocharger attached to an engine.

REFERENCE SIGNS LIST 1 (1A to 1C): shield
2: metal plate
21 (21a, 21b): protrusions
22 (22a, 22b): depressions
3: metal plate
31 (31a, 31b): protrusions
32 (32a, 32b): depressions
4: flexible member
5: unfilled spaces
6: peripheral edge
61: bent portion
62: folded portion
6a: corner portion
7: peripheral region
7a: attachment bore

The invention claimed is:

1. A shield comprising two metal plates disposed to face each other, and a plate-shaped flexible member interposed between the two metal plates, characterized in that
   each of the two metal plates has a plurality of protrusion-depression structures, wherein, when the flexible member is disposed between the two metal plates, the protrusion-depression structures are positioned to form gaps of a width greater than the thickness of the flexible member between the two metal plates, wherein the first and second plates define a first cross section, wherein the first and second plates define a second cross section substantially at right angles from the first cross section, wherein the plurality of protrusion-depression structures of one plate correspond to the protrusion depression structures of the other plate in both the first and second cross sections, and the two metal plates are disposed to face each other so as to have a positional relationship that allows the protrusion-depression structures of the respective plates to fit into one another,
   the two metal plates are positioned to form gaps of a width greater than the thickness of the flexible member between a pair of the depression and the protrusion structures of the two metal plates in both the first and second cross sections, and
   unfilled spaces that are not filled with the flexible member are formed in the gaps between the two metal plates, wherein each of the first and second cross sections define alternating profiles (a) metal plate, insulating material, air gap, and metal plate, and (b) metal plate, air gap, insulating material, and metal plate.

2. The shield according to claim 1, characterized in that the unfilled spaces are provided to correspond to the parts of the shield which protrude.

3. The shield according to claim 1, characterized in that a combination of the shapes of the protrusion-depression structures, the distance between the adjacent protrusion-depression structures, and the properties of the flexible member,
form the gaps of a width greater than the thickness of the flexible member between a pair of the depression and the protrusion of the two metal plates so that the flexible member does not adapt to the shapes of the protrusion-depression structures owing to the above combination.

4. The shield according to claim 1, characterized in that height differences of the protrusion-depression structures form the gaps of a width greater than the thickness of the flexible member between a pair of the depression and the protrusion of the two metal plates by difference of the height of the protrusion-depression structures.

5. The shield according to claim 1, characterized in that height differences of the protrusion-depression structures form the gaps of a width greater than the thickness of the flexible member between a pair of the depression and the protrusion of the two metal plates by difference of the height of the protrusion-depression structures.

6. A method for producing the shield according to claim 1, the shield comprising two metal plates disposed to face each other, and a plate-shaped flexible member interposed between the two metal plates, the method comprising:
  a corrugating step of molding a plurality of protrusion-depression structures in the two metal plates, and
  an interposing step of interposing the flexible member between the two metal plates so that the flexible member is fixed at a predetermined position between the two metal plates in which the protrusion-depression structures have been molded.

7. A shield comprising two metal plates disposed to face each other, and a plate-shaped flexible member interposed between the two metal plates, characterized in that
  each of the two metal plates has a plurality of protrusion-depression structures, wherein, when the flexible member is disposed between the two metal plates, the protrusion-depression structures are positioned to form gaps of a width greater than the thickness of the flexible member between the two metal plates, wherein the first and second plates define a first cross section, wherein the first and second plates define a second cross section substantially at right angles from the first cross section;
  wherein the plurality of protrusion-depression structures of one plate correspond to the protrusion depression structures of the other plate, and the two metal plates are disposed to face each other so as to have a positional relationship that allows the protrusion-depression structures of the respective plates to fit into one another,
  wherein the plurality of protrusion-depression structures in both the first and second cross sections have a distance between an adjacent protrusion and depression that is the same, and the two metal plates are positioned to form gaps of a width greater than the thickness of the flexible member between a pair of the depression and the protrusion structures of the two metal plates, and
  unfilled spaces that are not filled with the flexible member are formed in the gaps between the two metal plates in both the first and second cross sections, wherein each of the first and second cross sections define alternating profiles (a) metal plate, insulating material, air gap, and metal plate, and (b) metal plate, air gap, insulating material, and metal plate.

8. The shield according to claim 7, characterized in that the unfilled spaces are provided to correspond to the parts of the shield which protrude.

9. The shield according to claim 7, characterized in that
  a combination of the shapes of the protrusion-depression structures, the distance between the adjacent protrusion-depression structures, and the properties of the flexible member,
form the gaps of a width greater than the thickness of the flexible member between a pair of the depression and the protrusion of the two metal plates so that the flexible member does not adapt to the shapes of the protrusion-depression structures owing to the above combination.

10. A method for producing the shield according to claim 7, the shield comprising two metal plates disposed to face each other, and a plate-shaped flexible member interposed between the two metal plates, the method comprising:
  a corrugating step of molding a plurality of protrusion-depression structures in the two metal plates, and
  an interposing step of interposing the flexible member between the two metal plates so that the flexible member is fixed at a predetermined position between the two metal plates in which the protrusion-depression structures have been molded.

* * * * *